> 3,006,744
> Patented Oct. 31, 1961

3,006,744
RUBBER BASE SOLID COMPOSITE
PROPELLANT COMPOSITIONS
Barney W. Williams, Waco, Tex., assignor to Phillips
Petroleum Company, a corporation of Delaware
No Drawing. Filed Dec. 31, 1956, Ser. No. 631,941
6 Claims. (Cl. 52—.5)

This invention relates to solid propellant compositions. In one aspect, this invention relates to solid propellant compositions having improved storage properties.

Recently, it has been discovered that superior solid propellant materials are obtained comprising a solid oxidant such as ammonium nitrate or ammonium perchlorate, and a rubbery material such as a copolymer of butadiene and a vinylpyridine or other substituted heterocyclic nitrogen base compound, which after incorporation is cured by a quaternization reaction or a vulcanization reaction. Solid propellant mixtures of this nature and a process for their production are disclosed and claimed in copending application Serial No. 284,447, filed April 25, 1952, by W. B. Reynolds and J. E. Pritchard.

In the production of such solid propellant compositions, it is desirable that the products have good burning rate and good mechanical properties, such as high elongation and high tensile strength after extended storage as well as initially.

I have discovered that replacing a portion of the conjungated dieneheterocyclic nitrogen base copolymer in said propellant compositions with a GR–S rubber improves the storage properties of said propellants without adversely affecting the ballistic properties. Thus, broadly speaking, the propellant compositions of my invention comprise a solid inorganic oxidizer and a rubbery binder wherein said rubbery binder comprises a mixture of a copolymer prepared by copolymerizing a conjugated diene with a heterocyclic nitrogen base, and a GR–S rubber.

An object of this invention is to provide an improved propellant composition. Another object of this invention is to provide a propellant composition having improved storage properties. Still another object of this invention is to improve the storage properties of a propellant without adversely affecting the processing or ballistic properties of said propellant. Other aspects, objects, and advantages of the invention will be apparent to those skilled in the art in view of this disclosure.

Thus according to the invention, there is provided a propellant composition comprising a major portion of a solid inorganic oxidizer and a minor portion of a rubbery binder, the rubbery component of said binder comprising: a mixture of a first copolymer prepared by copolymerizing a conjugated diene with a heterocyclic nitrogen base, and a second copolymer prepared by copolymerizing 1,3-butadiene with styrene.

The amount of GR–S rubber employed in the propellant compositions of this invention will depend primarily upon the properties desired in the finished propellant. In most instances, replacement of from 5 to 20 percent by weight of the conjugated diene-heterocyclic nitrogen base copolymer in the binder with a GR–S rubber will usually impart the desired improved storage properties to the finished propellant. The more restricted range of 5 to 15 percent by weight GR–S rubber in the binder is, generally speaking, a preferred range. However, in some propellant formulations, replacement of 1 to 95 percent by weight of the conjugated diene-heterocyclic nitrogen base copolymer provides a usable rocket fuel.

The rubbery polymers employed as binders in the solid propellant compositions of this invention are copolymers of conjugated dienes with polymerizable hetero-cyclic nitrogen bases of the pyridine series. These copolymers can vary in consistency from very soft rubbers, i.e., materials which are soft at room temperature but will show retraction when relaxed, to those having a Mooney value (ML–4) up to 100. The rubbery copolymers most frequently preferred have Mooney values in the range between 10 and 40. They may be prepared by any polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 10 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy - 3 - ethylbutadiene, 2-ethoxy-3-ethyl-1,3-hexadiene, 2-cyano-1,3 - butadiene, are also applicable.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of the pyridine, quinoline, and isoquinoline series which are copolymerizable with a conjugated diene and contain one, and only one,

substituent wherein R' is either hydrogen or a methyl group. That is, the substituent is either a vinyl or an alpha-methylvinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

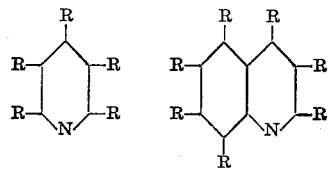

or

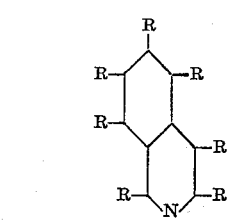

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl - 2 - vinylpyridine; 3-ethyl-5-vinylpyridine; 2,6-diethyl - 4 - vinylpyridine; 2-isopropyl-4-nonyl-5-vinylpyridine; 2-methyl-5-undecyl-3-vinylpyridine; 2,4 - dimethyl - 5,6 - dipentyl-3-vinylpyridine; 2-decyl-5-(alpha - methylvinyl)pyridine; 2-vinlyl-3-methyl-5-ethylpyridine; 2-methoxy - 4 - chloro-6-vinylpyridine; 3-vinyl-5-ethoxypyridine; 2-vinyl - 4,5 - dichloropyridine; 2-(alpha - methylvinyl) - 4 - hydroxy-6-cyanopyridine; 2-vinyl-4-phenoxy - 5 - methylpyridine; 2-cyano-5-(alpha-methylvinyl)pyridine; 3-vinyl - 5 - phenylpyridine; 2-(para-methyl-phenyl) - 3 - vinyl-4-methylpyridine; 3-vinyl-5-(hydroxyphenyl)pyridine; 2-vinylquinoline; 2-vinyl-4-ethylquinoline; 3-vinyl-6,7 - di - n - propylquinoline; 2-methyl-4-nonyl-6-vinylpyridine; 4(alpha - methylvinyl)-8-dodecylquinoline; 3 - vinylisoquinoline; 1,6 - dimethyl-3-vinyliso-quinoline; 2-vinyl-4-benzylquinoline; 3-vinyl-5-chloroethylquinoline - 3 - vinyl - 5,6 - dichloroisoquinoline; 2-vinyl-6-ethyoxy-7-methylquinoline; 3-vinyl-6-hydroxymethylisoquinoline; and the like.

The other rubbery polymer employed in the binder of the solid propellant composition of this invention is a copolymer of 1,3-butadine with styrene. Such copolymers are commonly known in the art as GR–S rubbers. Said GR–S rubbers can be prepared by any of the well known methods employing well known recipes. Any of the well known GR–S rubbers containing from 1 to 2 and up to about 25 parts of styrene can be used in the practice of the invention. The GR–S rubber designated as 1505 is a presently preferred copolymer for use in the practice of the invention. GR–S 1505 can be prepared by copolymerizing 1,3-butadiene with styrene at 41° F. using a sugar free, iron activated, rosin-acid emulsified system. A charge weight ratio of butadiene to styrene is 90/10 and the polymerization is allowed to go to approximately 52 percent completion. The copolymer is then salt acid coagulated and usually has a mean raw Mooney value (ML–4) of about 40. Said copolymers usually have a bound styrene content of about 8 weight percent. Further details regarding the preparation of GR–S rubbers can be found in Industrial and Engineering Chemistry, 40, pages 769–777 (1948) and United States Patent 2,583,277, 2,595,892, 2,609,362, 2,614,100, 2,647,109, and 2,665,269.

Oxidizers which are applicable in the solid propellant compositions of this invention are those oxygen-containing solids which readily give up oxygen and include, for example, ammonium, alkali metal, and alkaline earth metal salts of nitric, perchloric, and chloric acids, and mixtures thereof. Ammonium nitrate and ammonium perchlorate are the preferred oxidizers for use in the solid propellants of this invention. Other specific oxidizers include sodium nitrate, potassium perchlorate, lithium chlorate, calcium nitrate, barium perchlorate, and strontium chlorate. Mixtures of oxidizers are also applicable. In the preparation of the solid rocket propellant compositions, the oxidizers are ground to a particle size, preferably within the range between 20 and 200 microns average particle size. The most preferred particle size is from 40–60 microns. The amount of solid oxidizer used is usually a major amount of the total composition and is generally in the range between 50 and 85 percent by weight of the total propellant composition. If desired, however, the oxidizer can comprise less than 50 percent by weight of the propellant composition, in some instances. In the case of compression molded propellants, the propellant can contain 90 percent by weight and above of oxidizer based on total consumption. Thus, the oxidizer content of the propellant composition usually ranges from 50 to 90 percent by weight.

Burning rate catalysts applicable in the invention include ammonium dichromate and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, are usually in the range of 1 to 60 parts per one hundred parts of rubbery polymer with from 5 to 50 parts being most frequently preferred. The amount of combustion catalyst will usually be 0.25 to 12 parts by weight per hundred parts of oxidant and binder.

The binder contains rubbery copolymers of the type hereinbefore described and, in addition, there may be present one or more reinforcing agents, plasticizers, wetting agents, and antioxidants. Other ingredients which are employed for sulfur vulcanization include as vulcanization accelerator, a vulcanizing agent such as sulfur, and an accelerator activator, such as zinc oxide. The finished binder usually contains various compounding ingredients. Thus, it will be understood that herein and in the claims, unless otherwise specified the term "binder" is employed generically and includes various conventional compounding ingredients. The binder content of the propellant composition will usually range from 10 to 50 percent by weight.

The copolymer comprising a conjugated diene and a polymerizable heterocyclic nitrogen base can also be cured by a quaternization reaction by incorporating therein a quaternizing agent and subjecting the resulting mixture to quarternizing conditions of temperature. Suitable quaternizing agents include alkyl halides such as methyl iodide, methyl bromide; alkylene halides such as methylene iodide, ethylene bromide; substituted alkanes such as chloroform, bromoform, alkyl sulfates such as methyl sulfate; and various substituted aromatic compounds such as benzoyl chloride, methyl benzene sulfonate, and the like.

The quaternizing temperature is usually in the range zero to 175° C., although temperatures outside this range can be used.

A general formulation for a binder composition prepared by sulfur vulcanization is given below:

| | Parts by weight |
|---|---|
| Rubbery copolymer (as hereinbefore described) | 100 |
| Reinforcing agent | 0–50 |
| Plasticizer | 0–100 |
| Wetting agent | 0–10 |
| Antioxidant | 0–3 |
| Vulcanization accelerator | 0–5 |
| Sulfur | 0–2 |
| Metal oxide | 0–5 |
| Milori blue | 0–10 |

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins.

In general, any rubber plasticizer can be employed in these binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), di(1,4,7-trioxaundecyl)methane, and dioctyl phthalate are suitable plasticizers. Materials which provide rubber having good low temperature properties are preferred. It is also frequently preferred that the plasticizers be oxygen-containing materials.

Wetting agents aid in deflocculating or dispersing the oxidizer. Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants include Flexamine (physical mixture containing 65 percent of a complex diarylamine-ketone reaction product and 35 percent of N,N'-diphenyl-p-phenylenediamine), phenyl-beta-naphthylamine, 2,2-methylene-bis(4-methyl-6-tert-butylphenol), and the like. Rubber antioxidants, in general, can be employed or if desired can be omitted.

Examples of vulcanization accelerators are those of the carbamate type, such as N,N-dimethyl-S-tert-butyl-sulfenyl dithiocarbamate and Butyl-Eight. Butyl-Eight is a rubber accelerator of the dithiocarbamate type and is described in "Handbook of Material Trade Names" by Zimmerman and Lavine, 1953 edition, as a brown liquid; specific gravity 1.01; partially soluble in water and gasoline; and soluble in acetone, alcohol, benzol, carbon disulfide and chloroform.

It is to be understood that each of the various types of compounding ingredients can be used singly or mixtures of various ingredients performing a certain function can be employed. It is sometimes preferred, for example, to use mixtures of plasticizers rather than a single material.

The various ingredients in the propellant composition can be mixed on a roll mill or an internal mixer such as a Banbury or a Baker-Perkins dispersion blade mixer can be employed. The binder forms a continuous phase in the propellant with the oxidant as the discontinuous phase. One procedure for blending the propellant ingredients utilizes a stepwise addition of the oxidant ingredient. The binder ingredients are mixed to form a binder mixture and the oxidizer ingredient is then added to said binder mixture in four equal subsequent additions.

Rocket grains are formed by compression molding, injection molding, or extrusion.

The curing temperature will be limited by the oxidizer employed in some cases but will generally be in the range between 70 and 250° F., preferably between 170 and 200° F.

The curing time must be long enough to give required creep resistance and other mechanical properties in the propellant. The time will generally range from around three hours when the higher curing temperatures are employed to seven days when curing is effected at lower temperatures.

While this invention has been described using as the binder for propellant compositions a copolymer of a conjugated diene with a polymerizable heterocyclic nitrogen base of the pyridine series, such as vinylpyridine and various alkyl-substituted derivatives, it is to be understood that the corresponding quinoline and isoquinoline compounds are also applicable, i.e., vinylquinolines, vinylisoquinolines and various alkyl-substituted derivatives of these compounds.

EXAMPLE

A series of propellants having the compositions given in Table I below were prepared according to the method outlined above. Propellant No. 1 illustrates the improved propellant of the invention. Propellants 2 and 3 were control propellants.

Table I

| Ingredients | Propellant No. 1 | | | Propellants Nos. 2 & 3 | | |
|---|---|---|---|---|---|---|
| | phr | Parts by wt. | Percent by wt. | phr | Parts by wt. | Percent by wt. |
| Bd/MVP Copolymer (90:10) | 90 | 16.5 | 9.8 | 100 | 16.5 | 11.1 |
| GR-S 1505 Copolymer | 10 | | 1.1 | | | |
| Philblack A [1] | 22.5 | | 2.4 | 22.5 | | 2.5 |
| ZP-211 [2] | 20 | | 2.2 | 20 | | 2.2 |
| Flexamine [3] | 3 | | 0.3 | 3 | | 0.3 |
| Magnesium Oxide | 5 | | 0.5 | | 0.5 | 0.5 |
| Ammonium Nitrate | | 83.5 | 81.8 | | 83.5 | 81.8 |
| Milori Blue | | 2.0 | 1.9 | | 2.0 | 1.9 |
| | | 102.0 | 100.0 | | 102.5 | 100.0 |

[1] A furnace black.
[2] 5,8,11,13,16-19-hexoxa-n-tricosane.
[3] A physical mixture containing 65 percent of a complex diarylamine-ketone reaction product and 35 percent of N,N'-diphenyl-p-phenylenediamine.

After the above compositions had been thoroughly mixed, portions thereof were extruded to form strands approximately 3/16" in diameter. Said strands were then cured and burning rates were determined. The results of these burning rate tests are given in Table II below. The results of tensile and elongation tests on test specimens, after being aged for the periods of time indicated, are also given in Table II below.

Table II

| Propellant No. | Burning Rate at 600 p.s.i., in./sec. | Burning Rate Exponent | Storage Period | Ultimate Elongation, percent | Ultimate Stress (tensile), p.s.i. | Modulus |
|---|---|---|---|---|---|---|
| 1 | 0.174 | 0.54 | 1 wk at 77 | 17 | 160 | 2,200 |
| | | | 1 wk at 170 | 15 | 280 | 4,800 |
| | | | 2 wk at 170 | 11 | 370 | 3,900 |
| | | | 4 wk at 170 | 8 | 350 | 17,000 |
| 2 | 0.174 | 0.56 | 1 wk at 77 | 14 | 190 | 6,100 |
| | | | 1 wk at 170 | 6 | 490 | 18,600 |
| | | | 2 wk at 170 | 6 | 380 | |
| | | | 4 wk at 170 | 4 | 370 | 18,300 |
| 3 | 0.171 | 0.56 | 1 wk at 77 | 10 | 220 | 7,400 |
| | | | 1 wk at 170 | 5 | 390 | 17,000 |
| | | | 2 wk at 170 | 6 | 480 | |
| | | | 4 wk at 170 | 4 | 430 | 15,000 |

The data in the above Table II show that the elongation on propellant No. 1 was decreased much less with storage than was the elongation on propellants Nos. 2 and 3. These results definitely show that the improved propellant of the invention possesses better storage properties than do the control propellants. The propellant of the invention is less brittle than said control propellants. This is definitely a desirable property in solid propellant compositions because it reduces the likelihood of the propellant cracking during handling and/or under conditions of use.

The results of the tensile tests show that the improved propellant of the invention still possesses very satisfactory ultimate stress values even after complete curing.

The above accelerated storage tests show that the propellants of the invention would possess improved properties even after several years storage at normal temperatures.

Various modifications of the invention will be apparent to those skilled in the art in view of the above disclosure and said modifications can be made without departing from the spirit or scope of the invention.

I claim:
1. A propellant composition consisting essentially of from 50 to 90 weight percent of a solid inorganic oxidizer and from 10 to 50 weight percent of rubbery binder, the rubbery component of said binder consisting essentially of a mixture of a first copolymer present in an amount within the range of 80 to 95 weight percent and prepared by copolymerizing 1,3-butadiene with 2-methyl-5- vinylpyridine, and second copolymer present in an amount within the range of 5 to 20 weight percent and prepared by copolymerizing 1,3-butadiene with styrene.

2. The composition of claim 1 wherein said rubbery component of said binder consists essentially of from 85 to 95 percent by weight of said first copolymer and from 5 to 15 percent by weight of said second copolymer.

3. The composition of claim 1 wherein said rubbery component of said binder consists essentially of 90 parts per hundred parts of rubber of said first copolymer and 10 parts per hundred parts of rubber of said second copolymer.

4. A propellant composition consisting essentially of a major portion of a solid inorganic oxidizer and a minor portion of a rubbery binder, the rubbery component of said binder consisting essentially of: a mixture of (1) a first copolymer present in an amount within the range of 80 to 95 weight percent and prepared by copolymerizing a conjugated diene containing from 4 to 10 carbon atoms with at least one

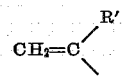

substituted heterocyclic nitrogen base selected from the group consisting of pyridine, quinoline, alkyl substituted pyridine, and alkyl substituted quinoline, wherein the total number of carbon atoms in the nuclear alkyl substituents is no more than 15, and wherein R' is selected from the group consisting of a hydrogen atom and a methyl radical; and (2) a second copolymer present in an amount within the range of 5 to 20 weight percent and prepared by copolymerizing 1,3-butadiene with styrene.

5. The composition of claim 4 wherein said rubbery component of said binder consists essentially of from 85 to 95 percent by weight of said first copolymer and from 5 to 15 percent by weight of said second copolymer.

6. The composition of claim 4 wherein said rubbery component of said binder consists essentially of 90 parts per hundred parts of rubber of said first copolymer and 10 parts per hundred parts of rubber of said second copolymer.

References Cited in the file of this patent

UNITED STATES PATENTS

| | | |
|---|---|---|
| 2,570,632 | Barton | Oct. 9, 1951 |
| 2,877,504 | Fox | Mar. 17, 1959 |

FOREIGN PATENTS

| | | |
|---|---|---|
| 655,585 | Great Britain | July 25, 1951 |
| 742,283 | Great Britain | Dec. 21, 1955 |